Sept. 15, 1925.
F. H. GLEASON
1,553,768
MEANS FOR MEASURING AND DELIVERING VOLUMES OF FLUID
Filed April 18, 1922
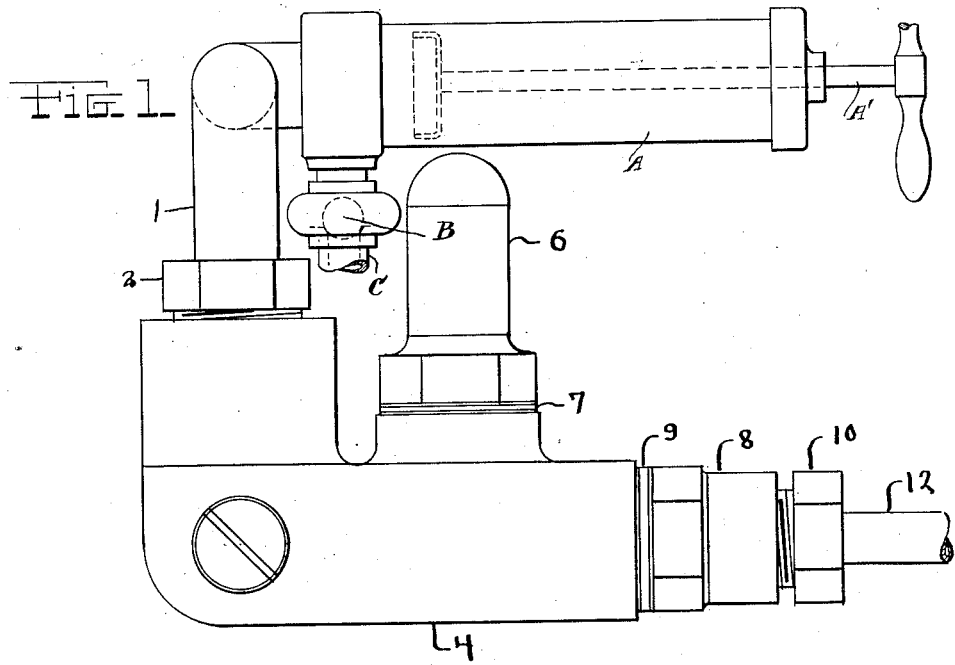
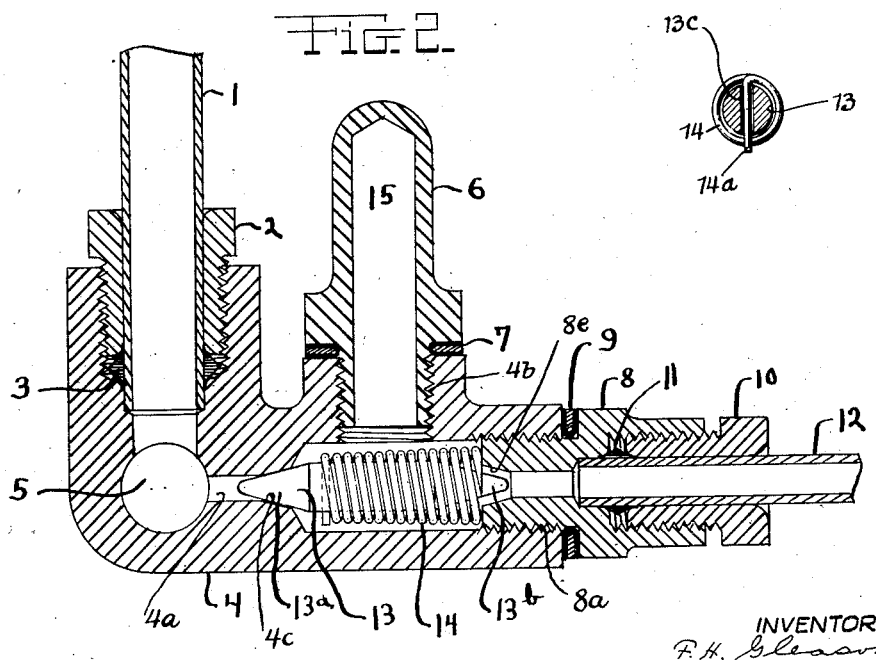
INVENTOR
F. H. Gleason
BY
A. P. Bourne
ATTORNEY Patented Sept. 15, 1925.

1,553,768

UNITED STATES PATENT OFFICE.

FREDERICK H. GLEASON, OF NEW YORK, N. Y.

MEANS FOR MEASURING AND DELIVERING VOLUMES OF FLUID.

Application filed April 18, 1922. Serial No. 554,837.

*To all whom it may concern:*

Be it known that I, FREDERICK H. GLEASON, a citizen of the United States, and resident of New York city, borough of Manhattan, in the county of New York and State of New York, have invented certain new and useful Improvements in Means for Measuring and Delivering Volumes of Fluid, of which the following is a specification.

This invention relates to certain improvements in lubricating systems.

The main object of the invention is to supply the required amount of lubricant to each of several bearings by means of compressed air whereby a gradual and comparatively slow and steady feed of the lubricant to the bearing will be effected as distinguished from the sudden propulsion of a volume of oil into a bearing under pump pressure.

In accordance with my invention I provide an air chamber in normal communication with the aforesaid delivery tube, means to supply said chamber with oil intermittently under pressure, and means to prevent flow of the supply oil or other fluid to said tube until after said chamber has received its charge of such oil or fluid and the pressure of the supply to said chamber has been reduced, whereby to cause air compressed within said chamber behind the fluid therein to effect the discharge of the fluid from said chamber to the delivery pipe, which will be under gradually decreasing pressure in the tube in accordance with the flow of fluid therefrom.

Where an oil supply system is established with several outlets, such as for lubricating the bearings of an automobile chassis, I provide a header having an oil receiving chamber to be supplied intermittently with oil under suitable pressure, means to connect said header with various delivery tubes, an oil receiving chamber normally in communication with each of said tubes, and means operative to permit flow from the header to said chambers under pressure and to cut off the flow to said tubes while said chambers are being charged from the header and to normally prevent flow of oil from said charged chambers to said header and permit flow from said charged chambers to said tubes for delivery of the oil therefrom.

My invention also comprises novel details of improvement which will be more fully hereinafter set forth and then pointed out in the claims.

Reference is to be had to the accompanying drawings, forming part hereof, wherein—

Figure 1 is a side view of my improved apparatus having a single delivery tube;

Figure 2 is a vertical section of Fig. 1;

Figure 3 is a detailed cross-section through the controlling valve 13.

Similar numerals of reference indicate corresponding parts in the several views.

The numeral 1 indicates a pipe or tube which is adapted to be intermittently supplied with oil or other fluid under pressure, as from a fluid pump of ordinary construction, such as indicated at A, having a check valve at B controlling return flow through inlet pipe C that may be connected with a fluid supply, or the fluid supply may be from a tank containing fluid under pressure which may be released to flow through pipe 1 by intermittently opening and closing a valve, which parts, being well known, need no further description.

A casing, which I term a header, is indicated at 4, to which supply pipe 1 is shown connected by means of nut 2 and a compression sleeve 3 of ordinary construction to provide a tight joint between the parts. The header 4 is provided with a passage or chamber 5 adapted to receive fluid under pressure from tube 1, being shown in communication with said tube. The casing or header 4 is provided with a channel or passage 4ª communicating with an air chamber 6, shown closed at its outer end and attached at its inner open end to a threaded passage 4ᵇ in casing or header 4 by means of screw threads, a gasket at 7 between the casing 4 and air chamber 6 providing a tight joint. A combined valve seat and tubing connection or fitting 8 is shown attached to header or casing 4 in communication with the bore or passage 4ª by means of threads at 8ª, a gasket 9 between the fitting 8 and casing 4 providing a tight joint. The oil delivery or outlet tube 12 is shown attached to the header by means of connection or fitting 8, a nut 10 upon said tube and compression sleeve 11 of ordinary construction serving to securely unite said parts. The bore 4ª is shown provided with a valve seat 4ᶜ and the inner end of connection or fitting 8 is shown provided with an opposing valve seat 8ᵉ to cooperate with the corresponding ends 13ª, 13ᵇ, of valve 13, said ends of said valve being shown tapered, said valve being shown located in the enlarged portion of bore 4ª between the seats 4ᵉ and 8ᵉ. A spring 14 is shown coiled around valve 13, bearing at one end against fitting 8 and at the opposite end connected to said valve, tending normally to retain the end 13ª of the valve against seat 4ᶜ. I have shown one end 14ª of spring 14 located in a hole 13ᶜ in valve 13 for normally pushing the valve toward seat 4ᶜ, (Fig. 3).

In the following description I will assume that oil is to be supplied to a bearing or bearings of an automobile chassis, although it will be understood that any other desired or suitable fluid may be correspondingly supplied and delivered to a desired place or places.

Valve 13 is normally held to its seat 4ᵉ by spring 13 and its end 13ᵇ is unseated from seat 8ᵉ, hence the air chamber is in normal communication with the corresponding delivery tube. When oil under pressure is supplied through pipe 1 to passage 5 in header or casing 4, such oil will cause valve 13 to move to close at seat 8ᵉ and open communication between passage 5 and the corresponding air chamber. Such oil under pressure will flow from passage 5 into the space around valve 13 and trap air in space 15 of the air chamber, and continued pressure of the oil will force the oil up into space 15 and compress therein the volume of trapped air to a pressure substantially corresponding to the pressure of the oil flow in pipe 1. When the pressure on the oil in passage 5 is removed, the spring 14, in conjunction with the air pressure on the oil within the air chamber, will cause valve 13 to return to seat 4ᶜ, thus closing the oil inlet passage from the supply source from pipe 1 and opening the outlet from chamber 6 at seat 8ᵉ by the withdrawal of valve 13 from said seat, and the pressure of air in chamber 6 above the oil therein will cause such oil to be slowly forced through the corresponding outlet tube by reason of the expansion of the trapped compressed air in space 15. The delivery of oil through tube 12 will continue until the trapped air in chamber 15 reaches a state of equilibrium with atmosphere. After each intermittent application of oil under pressure to passage 5, as for each intermittent stroke of the pump plunger A', a measured volume of oil equal to the volume of oil in space 15 of air chamber 6 will be delivered by tube 12. The desired volume of oil to be delivered can be increased or diminished by increasing or diminishing the size or the volume of space 15 in air chamber 6.

A novel feature of my invention is that if any outlet tube should be stopped up the corresponding valve 13 will not entirely transfer and close the delivery outlet at the seat 8ᵉ, thus permitting the direct pressure of the oil supply to be applied to the stopped tube, thereby serving to force the obstruction from such tube and clean it out.

A further novel feature of my invention is that when the air chamber is charged with oil a slow feed of oil is provided through the delivery tube for a relatively long time until the air pressure in the air chamber is equalized at atmosphere.

With the delivery tube connected to various bearings of an automobile chassis it will merely be necessary to operate pump plunger A' to charge chamber 5, channel or channels 4ª, and the air chambers and then release the plunger to permit the air trapped and compressed in the air chambers to cause the gradual feeding of the oil therefrom through the delivery tubes to the several bearings. It will not be necessary to again operate the pump plunger until the bearings require fresh lubricant, hence the supply operation for the oil in pipe 1 is what I term intermittent, meaning that the fluid pumping or forcing operation is followed by a period of inaction for any desired length of time.

Having now described my invention, what I claim is:

1. A lubricating system comprising a receptacle for lubricant, a conduit leading therefrom to a part to be lubricated, an air chamber, a valve casing interposed in said conduit, a valve in said casing adapted to normally cut off communication between the receptacle and the air chamber, a second valve movable with the first named valve and normally held in position, permitting communication between the air chamber and the part to be lubricated, means for forcing lubricant from the receptacle into said conduit to move said valve to open communication between the receptacle and the air chamber and instantaneously close communication between the air chamber and the part to be lubricated whereby said air chamber is charged with lubricant backed by air under pressure, means for shifting said valves simultaneously when the pressure on the lubricant from the receptacle is released to close communication between the receptacle and the air chamber and open communication between the air chamber and the part to be lubricated, whereby the lubricant is gradually forced to the part to be lubricated solely by the trapped air under pressure after communication between the receptacle and the air chamber has been cut off.

2. A lubricating system comprising a source of lubricant, a conduit leading therefrom to a part to be lubricated, a valve chamber having oppositely disposed oppositely tapered seats, a comparatively long small diameter air chamber in communication with the valve chamber, a valve stem having opposite tapering ends forming valves adapted to cooperate with said seats respectively, the operative portions of said tapering ends being but slightly less distance apart than said seats to cooperate with one of said seats only, at a time, but adapted to be practically instantaneously shifted from one seat to the other, a spring normally maintaining one valve against one of said seats to resist the flow of lubricant into the valve chamber from said source of lubricant but permitting discharge of the lubricant under the action of compressed air trapped in the air chamber gradually to the bearing only at a time when communication between the source of lubricant and the air chamber has been cut off.

3. A lubricating system comprising a source of lubricant, piping leading therefrom to a part to be lubricated, a valve chamber interposed in said piping and having seats at its opposite ends, a floating valve stem having valves at its opposite ends movable endwise in said chamber to bring either of said valves into contact with its respective seat, the length of said valve stem and its associated valves being but slightly less than the distance between said valve seats whereby shifting movement of said valves is effected practically instantaneously, and an air chamber in communication with the valve chamber.

4. A lubricating system comprising a source of lubricant, piping leading therefrom to a part to be lubricated, a valve casing interposed in said piping and having oppositely disposed seats, a comparatively long small diameter air chamber in communication with said valve chamber, a floating valve stem in said valve chamber and having oppositely tapering ends forming valves for cooperation with said seats respectively, the operative portions of said tapering ends being a slightly less distance apart than said seats whereby shifting of the valves is effected practically instantaneously.

5. A lubricating system comprising a source of lubricant, piping leading therefrom to a part to be lubricated, a valve casing interposed in said piping and having opposite disposed seats, a comparatively long small diameter air chamber in communication with said valve chamber, a floating valve stem in said valve chamber and having oppositely tapering ends forming valves for cooperation with said seats respectively, the operative portions of said tapering ends being a slightly less distance apart than said seats whereby shifting of the valves is effected practically instantaneously, a spring coiled about the valve stem for normally maintaining the valve against its seat to resist flow of lubricant frame the source to the air chamber.

6. A lubricating system comprising a source of lubricant, piping leading therefrom to a part to be lubricated, a valve casing interposed in said piping and having opposite disposed seats, a comparatively long small diameter air chamber in communication with said valve chamber, a floating valve stem in said valve chamber and having oppositely tapering ends forming valves for cooperation with said seats respectively, the operative portions of said tapering ends being a slightly less distance apart than said seats whereby shifting of the valves is effected practically instantaneously, spring means for normally maintaining the valve against its seat to resist flow of lubricant from the source to the air chamber and permitting discharge of lubricant from the air chamber under the action of the air compressed therein gradually to the bearing, said valve stem and valve adapted for instantaneous shifting movement under pressure of lubricant from the source to open communication between the source and the air chamber and close communication between the air chamber and the part to be lubricated.

7. In a lubricating system comprising a source of lubricant, a conduit leading therefrom to a part to be lubricated, means for forcing lubricant into said conduit under pressure, and means in connection with the conduit, and including an air chamber for receiving lubricant under pressure from said conduit, whereby air is trapped and compressed in said chamber at the rear of the lubricant, and means permitting discharge of lubricant from said air chamber under the action of the air compressed therein only when communication is cut off between the air chamber and the source of lubricant.

Signed at New York city, in the county of New York and State of New York, this 17th day of April, A. D. 1922.

FREDERICK H. GLEASON.